United States Patent
Yasukawa et al.

(10) Patent No.: US 12,058,747 B2
(45) Date of Patent: Aug. 6, 2024

(54) USER DEVICE, SIGNAL TRANSMISSION METHOD, AND SIGNAL RECEPTION METHOD

(71) Applicant: NTT DOCOMO, INC., Tokyo (JP)

(72) Inventors: Shimpei Yasukawa, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/891,297

(22) Filed: Feb. 7, 2018

(65) Prior Publication Data

US 2018/0167989 A1    Jun. 14, 2018

Related U.S. Application Data

(63) Continuation of application No. PCT/JP2016/073412, filed on Aug. 9, 2016.

(30) Foreign Application Priority Data

Aug. 13, 2015  (JP) .................................. 2015-159992

(51) Int. Cl.
*H04W 72/04*  (2023.01)
*H04J 11/00*  (2006.01)
(Continued)

(52) U.S. Cl.
CPC ............. *H04W 76/14* (2018.02); *H04J 11/00* (2013.01); *H04L 5/0048* (2013.01);
(Continued)

(58) Field of Classification Search
CPC ..... H04W 76/14; H04W 48/08; H04W 8/005; H04W 92/18; H04W 72/04;
(Continued)

(56) References Cited

U.S. PATENT DOCUMENTS

2013/0272262 A1*  10/2013  Li ......................... H04L 5/0048
                                                        370/330
2015/0016428 A1*   1/2015  Narasimha ........ H04W 56/0045
                                                        370/336
(Continued)

FOREIGN PATENT DOCUMENTS

JP        201177647     *  4/2011   ............ H04W 28/06
JP        201177647 A     4/2011
(Continued)

OTHER PUBLICATIONS

LTE; Evolved Universal Terrestrial Radio Access (E-UTRA); Jan. 2016, Physical channels and modulation (3GPP TS 36.211 version 12.8.0 Release 12).*

(Continued)

*Primary Examiner* — Lakeram Jangbahadur
(74) *Attorney, Agent, or Firm* — Osha Bergman Watanabe & Burton LLP

(57) ABSTRACT

A user device for a radio communication system supporting Device-to-Device (D2D) communication is disclosed. The user device includes a transmitter that transmits a D2D signal by mapping a reference signal to a physical channel according to a first mapping configuration or according to a second mapping configuration. The reference signal is mapped to more symbols in the second mapping configuration than in the first mapping configuration. When transmitting the D2D signal by applying the second mapping configuration to a Physical Sidelink Shared Channel (PSSCH), the transmitter of the user device generates parameters for generating the reference signal to be mapped to the PSSCH based on information included in a Physical Sidelink Control Channel (PSSCH).

6 Claims, 17 Drawing Sheets

(51) Int. Cl.

| | | |
|---|---|---|
| *H04L 5/00* | (2006.01) | |
| *H04L 25/02* | (2006.01) | |
| *H04L 27/01* | (2006.01) | |
| *H04W 8/00* | (2009.01) | |
| *H04W 48/08* | (2009.01) | |
| *H04W 76/14* | (2018.01) | |
| *H04W 92/18* | (2009.01) | |
| *H04W 72/20* | (2023.01) | |

(52) U.S. Cl.
CPC .......... *H04L 25/0224* (2013.01); *H04L 27/01* (2013.01); *H04W 8/005* (2013.01); *H04W 48/08* (2013.01); *H04W 72/04* (2013.01); *H04W 92/18* (2013.01); *H04W 72/20* (2023.01)

(58) Field of Classification Search
CPC .......... H04W 72/0406; H04L 25/0224; H04L 5/0048; H04L 27/01; H04J 11/00
See application file for complete search history.

(56) References Cited

U.S. PATENT DOCUMENTS

| | | | |
|---|---|---|---|
| 2016/0066324 A1* | 3/2016 | Li | H04L 69/22 370/338 |
| 2016/0135240 A1* | 5/2016 | Yoon | H04W 56/001 370/329 |
| 2016/0302248 A1* | 10/2016 | Yi | H04L 1/1812 |
| 2016/0337935 A1* | 11/2016 | Patil | H04W 76/14 |
| 2017/0019886 A1* | 1/2017 | Patel | H04W 72/23 |
| 2019/0261442 A1* | 8/2019 | Yoon | H04W 76/14 |

FOREIGN PATENT DOCUMENTS

| | | | | |
|---|---|---|---|---|
| JP | 201177647 A | * | 10/2014 | |
| JP | 2015518333 A | | 6/2015 | |
| WO | 2015115743 A1 | | 8/2015 | |
| WO | WO-2015115743 A1 | * | 8/2015 | .......... H04B 7/2612 |

OTHER PUBLICATIONS

JP 2011 077647 A (SHARP KK) Apr. 14, 2011 (Apr. 14, 2011).*
LTE; Evolved Universal Terrestrial Radio Access (E-UTRA); Physical channels and modulation (3GPP TS 36.211 version 12.8.0 Release 12)—see Section 9 p. 122-0126, p. 130, Table 9.8-1, p. 131, Table 9.8-2.*
Extended European Search Report issued in counterpart European Patent Application No. 16835174, mailed Sep. 4, 2018 (10 Pages).
3GPP RAN #68 RP150626; LTE-based Vehicle to Vehicle Communications; Jun. 2015 (13 Pages).
International Search Report issued in the corresponding International Application No. PCT/JP2016/073412, mailed Oct. 11, 2016 (3 pages).
Written Opinion issued in the corresponding International Application No. PCT/JP2016/073412, mailed Oct. 11, 2016 (4 pages).
Balazs Bertenyi; "Key drivers for LTE success: Services Evolution"; 3GPP Seminar, LTE Asia, Sep. 6, 2011 (15 pages).
Office Action issued in counterpart Chinese Patent Application No. 201680046398.X, mailed Jan. 4, 2019 (13 Pages).
3GPP TS 36.211 V12.6.0; "3rd Generation Partnership Project; Technical Specifcation Group Radio Access Network; Evolved Universal Terrestrial Radio Access (E-UTRA); Physical channels and modulation (Release 12)"; Jun. 2015.
3GPP Draft; F-06921 "UE procedures related to Sidelink" Sophia-Antipolis Cedex, France; Dec. 7, 2014 (17 pages).
Office Action issued in European Application No. 168351740; Dated April 16, 2021 (9 pages).
Office Action issued in counterpart European Patent Application No. 16 835 174.0 mailed on Jan. 2, 2023 (8 pages).

* cited by examiner

FIG.12

| PARAMETER IN CLAUSE 5.5.2.1 | | PSSCH | PSCCH | PSDCH | PSBCH |
|---|---|---|---|---|---|
| GROUP HOPPING | | ENABLED | DISABLED | DISABLED | DISABLED |
| | $n_{ID}^{RS}$ | $n_{ID}^{SA}$ | 510 | 510 | $\lfloor N_{ID}^{SL}/16 \rfloor$ |
| | $\Delta_{ss}$ | 0 | 0 | 0 | 0 |
| | $n_s$ | $n_{ss}^{PSSCH}$ | − | − | − |
| SEQUENCE HOPPING | | DISABLED | DISABLED | DISABLED | DISABLED |
| CYCLIC SHIFT | $n_{cs,\lambda}$ | $\lfloor n_{ID}^{SA}/2 \rfloor \bmod 8$ | 0 | 0 | $\lfloor N_{ID}^{SL}/2 \rfloor \bmod 8$ |
| ORTHOGONAL SEQUENCE | $[w^{\lambda}(0)\ w^{\lambda}(1)]$ | $[+1\ +1]\ if\ n_{ID}^{SA} \bmod 2 = 0$ $[+1\ -1]\ if\ n_{ID}^{SA} \bmod 2 = 1$ | $[+1\ +1]$ | $[+1\ +1]$ | $[+1\ +1]\ if\ N_{ID}^{SL} \bmod 2 = 0$ $[+1\ -1]\ if\ N_{ID}^{SL} \bmod 2 = 1$ |
| CELL IDENTITY | $N_{ID}^{cell}$ | $n_{ID}^{SA}$ | 510 | 510 | $\lfloor N_{ID}^{SL}/16 \rfloor$ |
| REFERENCE SIGNAL LENGTH | $M_{sc}^{RS}$ | $M_{sc}^{PSSCH}$ | $M_{sc}^{PSCCH}$ | $M_{sc}^{PSDCH}$ | $M_{sc}^{PSBCH}$ |
| NUMBER OF LAYERS | $\upsilon$ | 1 | 1 | 1 | 1 |
| NUMBER OF ANTENNA PORTS | $P$ | 1 | 1 | 1 | 1 |

FIG.13

| PARAMETER IN CLAUSE 5.5.2.1 | | PSSCH | PSCCH | PSDCH | PSBCH |
|---|---|---|---|---|---|
| GROUP HOPPING | | ENABLED | DISABLED | DISABLED | DISABLED |
| | $n_{ID}^{RS}$ | $n_{ID}^{SA}$ | 510 | 510 | $\lfloor N_{ID}^{SL}/16 \rfloor$ |
| | $\Delta_{ss}$ | 0 | 0 | 0 | 0 |
| | $n_s$ | $n_{ss}^{PSSCH}$ | – | – | – |
| SEQUENCE HOPPING | | DISABLED | DISABLED | DISABLED | DISABLED |
| CYCLIC SHIFT | $n_{cs,\lambda}$ | $\lfloor (n_{ID}^{SA}/2 \boxed{+4}) \rfloor \bmod 8$ | 0 | 0 | $\lfloor (n_{ID}^{SL}/2 \boxed{+4}) \rfloor \bmod 8$ |
| ORTHOGONAL SEQUENCE | $[w^\lambda(0) \ w^\lambda(1)]$ | $[+1 \ +1]$ if $n_{ID}^{SA} \bmod 2 = \boxed{1}$<br>$[+1 \ -1]$ if $n_{ID}^{SA} \bmod 2 = \boxed{0}$ | $\boxed{[+1 \ -1]}$ | $\boxed{[+1 \ -1]}$ | $[+1 \ +1]$ if $n_{ID}^{SL} \bmod 2 = \boxed{1}$<br>$[+1 \ -1]$ if $n_{ID}^{SL} \bmod 2 = \boxed{0}$ |
| CELL IDENTITY | $N_{ID}^{cell}$ | $n_{ID}^{SA}$ | 510 | 510 | $\lfloor N_{ID}^{SL}/16 \rfloor$ |
| REFERENCE SIGNAL LENGTH | $M_{sc}^{RS}$ | $M_{sc}^{PSSCH}$ | $M_{sc}^{PSCCH}$ | $M_{sc}^{PSDCH}$ | $M_{sc}^{PSBCH}$ |
| NUMBER OF LAYERS | $\upsilon$ | 1 | 1 | 1 | 1 |
| NUMBER OF ANTENNA PORTS | $P$ | 1 | 1 | 1 | 1 |

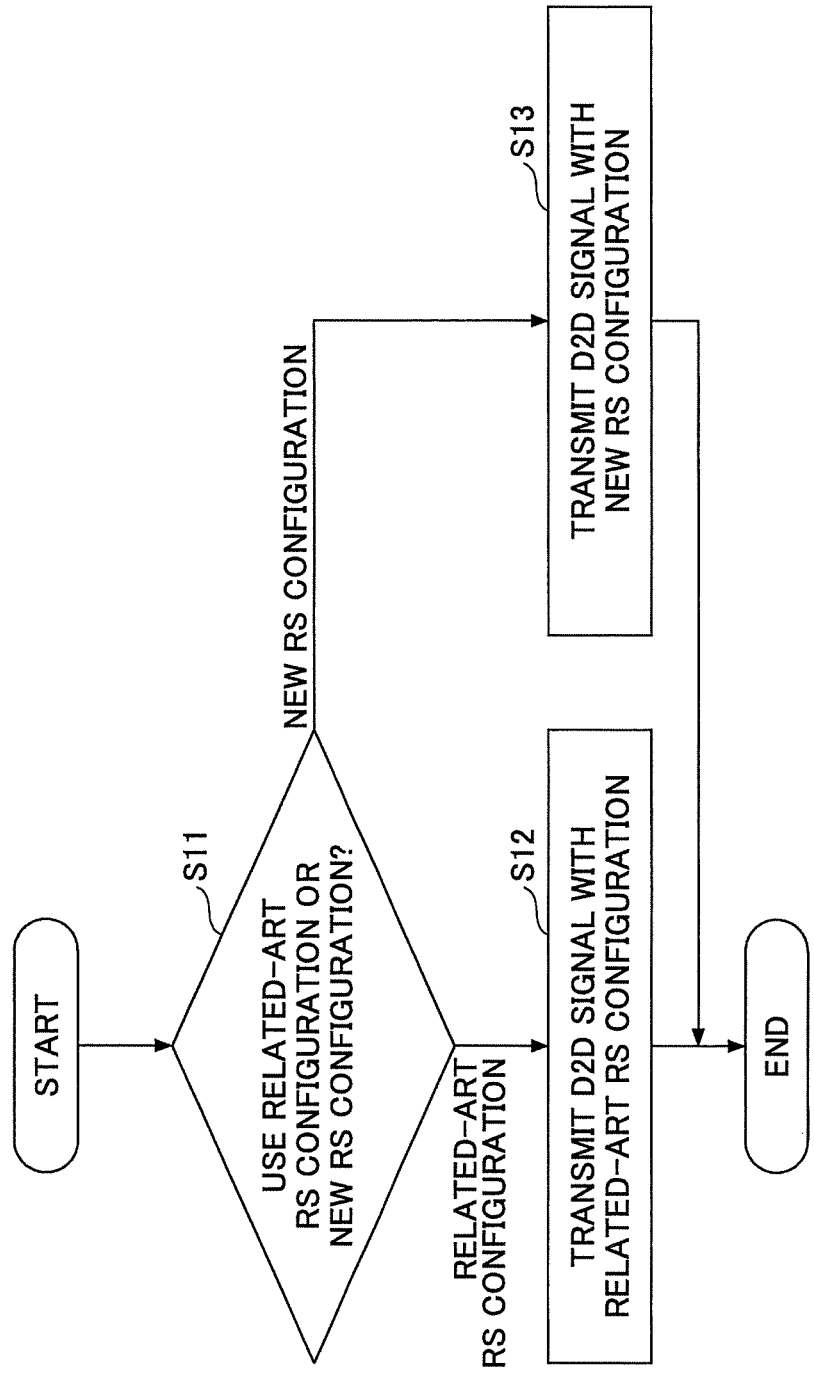

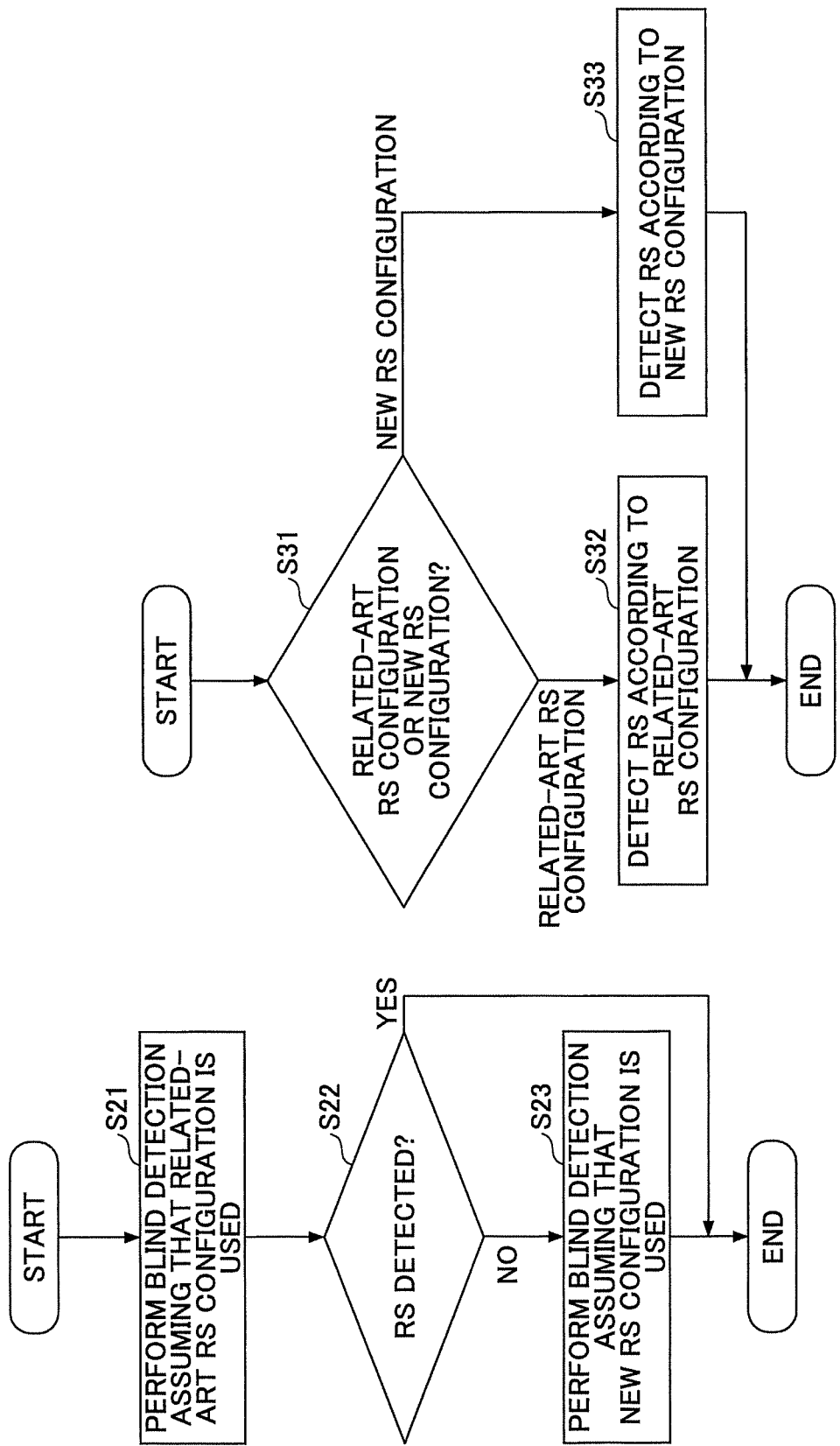

USER DEVICE, SIGNAL TRANSMISSION METHOD, AND SIGNAL RECEPTION METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/073412, filed on Aug. 9, 2016, which is based on and claims the benefit of priority of Japanese Patent Application No. 2015-159992 filed on Aug. 13, 2015, the entire contents of which are incorporated herein by reference.

FIELD OF THE INVENTION

Aspects of this disclosure relate to a user device, a signal transmission method, and a signal reception method.

BACKGROUND

In Long Term Evolution (LTE) and successor systems (e.g., LTE Advanced (LTE-A), Future Radio Access Systems (FRA), and 4G) to LTE, a Device to Device (D2D) technology where user terminals directly communicate with each other without the intervention of a radio base station is being considered (see, for example, "Key drivers for LTE success: Services Evolution", September 2011, 3GPP, Internet URL:
http://www.3gpp.org/ftp/Information/presentations/presentations_2011/2011_09_LTE_Asia/2011_LTE-Asia_3GPP_Service_evolution.pdf).

D2D makes it possible to reduce the traffic between user devices and base stations and enables user devices to communicate with each other even when base stations become incapable of communication due to, for example, disasters.

D2D is roughly divided into D2D discovery for finding another user device that is capable of communication and D2D communication (which may also be referred to as "D2D direct communication" or "inter-terminal direct communication") for allowing terminals to directly communicate with each other. In the descriptions below, D2D communication and D2D discovery are simply referred to as "D2D" when it is not necessary to make a distinction between them. Also, signals transmitted and received in D2D are referred to as "D2D signals".

Also, in the 3rd Generation Partnership Project (3GPP), it is being considered to achieve Vehicle to Everything (V2X) by expanding D2D functions. Here, V2X is a part of Intelligent Transport Systems (ITS) and as illustrated in FIG. 1, is a generic term for Vehicle to Vehicle (V2V) indicating communication between vehicles, Vehicle to Infrastructure (V2I) indicating communication between a vehicle and a road-side unit (RSU) installed on a roadside, Vehicle to Nomadic device (V2N) indicating communication between a vehicle and a mobile terminal of a driver), and Vehicle to Pedestrian (V2P) indicating communication between a vehicle and a mobile terminal of a pedestrian.

A physical channel used for D2D employs a frame structure similar to a physical uplink shared channel (PUSCH) of LTE. In the physical channel, as illustrated by FIG. 2, a demodulation-reference signal (DM-RS) is mapped to two Single Carrier Frequency Division Multiple Access (SC-FDMA) symbols in each subframe.

Here, support for high-speed movement (support for a relative speed of 280 km/h between vehicles) is one of requirements peculiar to V2X. A receiving user device uses DM-RS to perform channel estimation that is necessary to demodulate a received signal. However, the accuracy of channel estimation may be reduced due to the influence of a high Doppler frequency resulting from high-speed movement.

The reduction in the channel estimation accuracy due to a high Doppler frequency may be effectively prevented by increasing the time density of DM-RS (i.e., by mapping DM-RS to more SC-FDMA symbols in one subframe). However, simply increasing the time density of DM-RS may decrease the amount of data in a physical channel and reduce the throughput, and may increase the code rate and reduce the error correction performance. Accordingly, it is preferable to change the mapping of a reference signal according to the degree of influence of a high Doppler frequency.

SUMMARY

In accordance with embodiments of the invention a user device is disclosed for a radio communication system supporting Device-to-Device (D2D) communication, the user device comprising: a transmitter that transmits a D2D signal by mapping a reference signal to a physical channel according to a first mapping configuration or according to a second mapping configuration, wherein the reference signal is mapped to more symbols in the second mapping configuration than in the first mapping configuration, and wherein when transmitting the D2D signal by applying the second mapping configuration to a Physical Sidelink Shared Channel (PSSCH), the transmitter generates parameters for generating the reference signal to be mapped to the PSSCH based on information included in a Physical Sidelink Control Channel (PSSCH).

In some aspects of the user device the transmitter transmits the D2D signal by mapping the reference signal to the physical channel according to the first mapping configuration when a moving speed of the user device is less than or equal to a predetermined threshold, and transmits the D2D signal by mapping the reference signal to the physical channel according to the second mapping configuration when the moving speed of the user device is greater than the predetermined threshold.

In some aspects of the user device, the transmitter transmits the D2D signal where the reference signal is mapped to the physical channel according to the first mapping configuration or the D2D signal where the reference signal is mapped to the physical channel according to the second mapping configuration, based on an instruction from a base station.

In accordance with embodiments of the invention a user device is disclosed for a radio communication system supporting Device-to-Device (D2D) communication, the user device comprising: a receiver that receives a D2D signal; a detector that determines whether a reference signal is mapped to a physical channel in the D2D signal according to a first mapping configuration or according to a second mapping configuration, and detects the reference signal based on a result of the determination; and an estimator that performs channel estimation using the reference signal detected by the detector, wherein the reference signal is mapped to more symbols in the second mapping configuration than in the first mapping configuration.

In some aspects of the user device, when determining that the reference signal is mapped to a first physical channel according to the first mapping configuration, the detector determines that a reference signal in a second physical channel is also mapped according to the first mapping configuration; and when determining that the reference signal is mapped to the first physical channel according to the second mapping configuration, the detector determines that the reference signal in the second physical channel is also mapped according to the second mapping configuration.

In some aspects of the user device when the second mapping configuration is applied to a Physical Sidelink Shared Channel (PSSCH), the estimator identifies parameters used to generate the reference signal mapped to the PSSCH based on information included in a Physical Sidelink Control Channel (PSSCH), and performs the channel estimation by using the identified parameters.

In accordance with embodiments of the invention a signal transmission method is disclosed that is performed by a user device for a radio communication system supporting D2D communication, the method comprising: transmitting a D2D signal by mapping a reference signal to a physical channel according to a first mapping configuration or according to a second mapping configuration, wherein the reference signal is mapped to more symbols in the second mapping configuration than in the first mapping configuration, and wherein when transmitting the D2D signal by applying the second mapping configuration to a Physical Sidelink Shared Channel (PSSCH), parameters for generating the reference signal to be mapped to the PSSCH are generated based on information included in a Physical Sidelink Control Channel (PSCCH).

In accordance with embodiments of the invention a signal reception method is disclosed that is performed by a user device for a radio communication system supporting D2D communication, the method comprising: receiving a Device-to-Device (D2D) signal; determining whether a reference signal is mapped to a physical channel in the D2D signal according to a first mapping configuration or according to a second mapping configuration, and detecting the reference signal based on a result of the determination; and performing channel estimation using the detected reference signal, wherein the reference signal is mapped to more symbols in the second mapping configuration than in the first mapping configuration.

BRIEF DESCRIPTION OF THE DRAWINGS

FIG. 12 is a table illustrating reference signal parameters defined in current D2D;

FIG. 13 is a table illustrating examples of reference signal parameters used for physical channels having a new RS configuration in accordance with embodiments of the invention;

FIG. 14 is a flowchart illustrating an exemplary process performed by a transmitting user device in accordance with embodiments of the invention;

FIGS. 15A and 15B are flowcharts illustrating exemplary processes performed by a receiving user device in accordance with embodiments of the invention;

DETAILED DESCRIPTION

An aspect of this disclosure provides a technology that makes it possible to properly change the mapping of a reference signal in a radio communication system supporting D2D.

In an aspect of this disclosure, there is provided a user device for a radio communication system supporting D2D D2D communication. The user device includes a transmitter that transmits a D2D signal by mapping a reference signal to a physical channel according to a first mapping configuration or according to a second mapping configuration where the reference signal is mapped to more symbols than in the first mapping configuration. When transmitting the D2D signal by applying the second mapping configuration to a Physical Sidelink Shared Channel (PSSCH), the transmitter generates parameters for generating the reference signal to be mapped to the PSSCH based on information included in a PSCCH.

Embodiments of the present invention are described below with reference to the accompanying drawings. Embodiments described below are examples, and the present invention is not limited to those embodiments. For example, although it is assumed that a radio communication system according to the embodiments conforms to LTE, the present invention is not limited to LTE and may also be applied to other types of systems. In the specification and the claims of the present application, "LTE" is used in a broad sense and may indicate not only a communication system corresponding to 3GPP release 8 or 9, but also a fifth-generation communication system corresponding to 3GPP release 10, 11, 12, 13, 14, or later.

<Outline>

Figure 3:
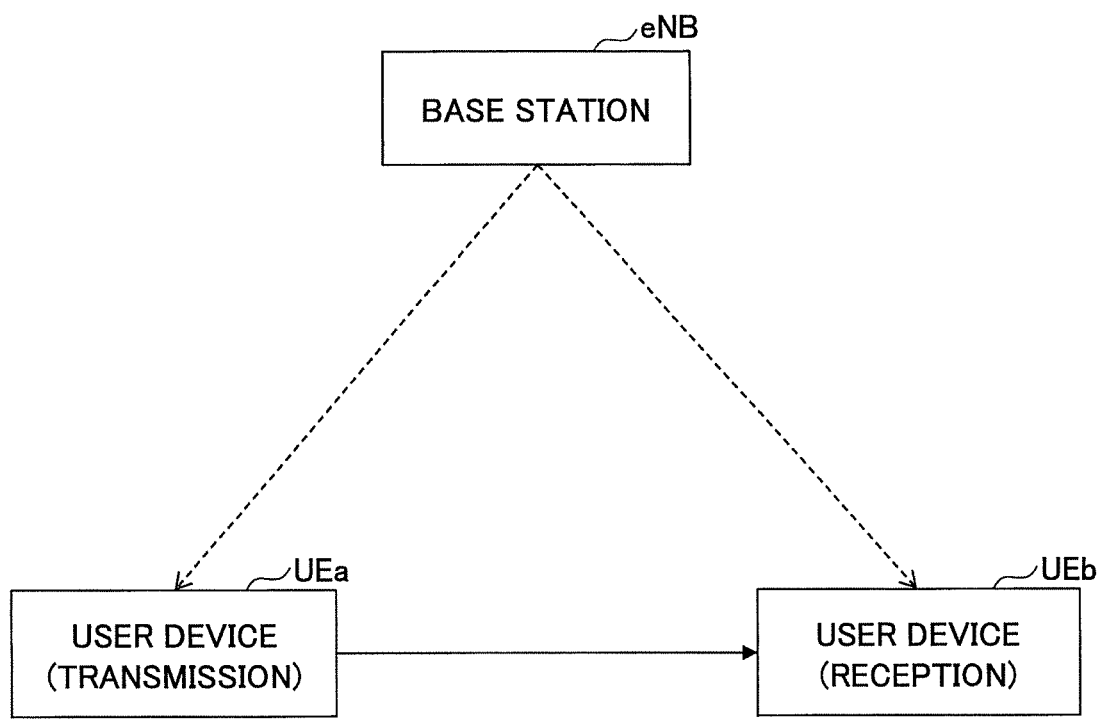
FIG. 3 is a drawing illustrating an example of a configuration of a radio communication system in accordance with embodiments of the invention.

As illustrated by FIG. 3, a radio communication system of one or more embodiments includes a base station eNB, a transmitting user device UEa that transmits a D2D signal, and a receiving user device UEb that receives the D2D signal. The base station eNB, for example, allocates a resource pool used for transmission and reception of D2D signals by using broadcast information (system information: SIB) of a macro cell or a radio resource control (RRC). In the descriptions below, the transmitting user device UEa and the receiving user device UEb may be collectively referred to as a "user device(s) UE".

In D2D communication, a part of uplink resources predefined as resources for uplink signal transmission from the user device UE to the base station eNB is used. Below, an outline of D2D signal transmission in LTE is described.

Figure 4A:
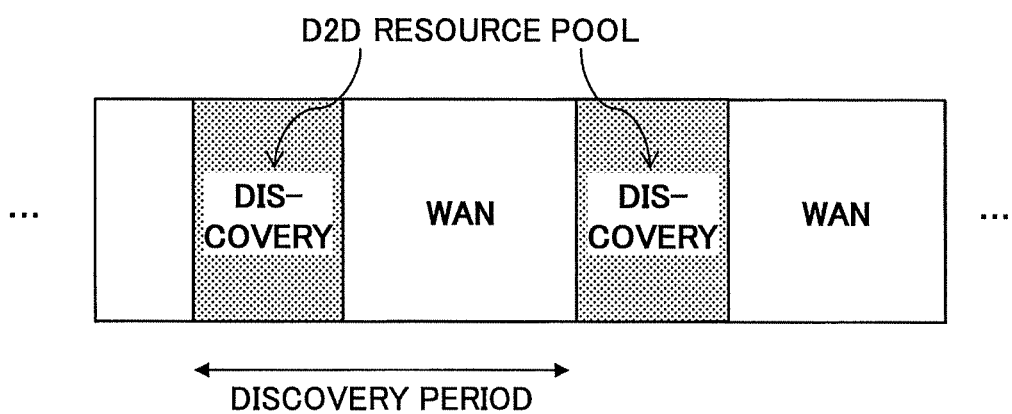
FIGS. 4A and 4B are drawings used to describe D2D communication in accordance with embodiments of the invention.

For "Discovery", as illustrated by FIG. 4A, a resource pool for a discovery message is reserved for each discovery period, and the user device UEa transmits the discovery message within the resource pool. More specifically, there are Type 1 and Type 2b. In Type 1, the user device UEa autonomously selects transmission resources from the resource pool. In Type 2b, resources are allocated semi-statically by upper layer signaling (e.g., an RRC signal).

Figure 4B:
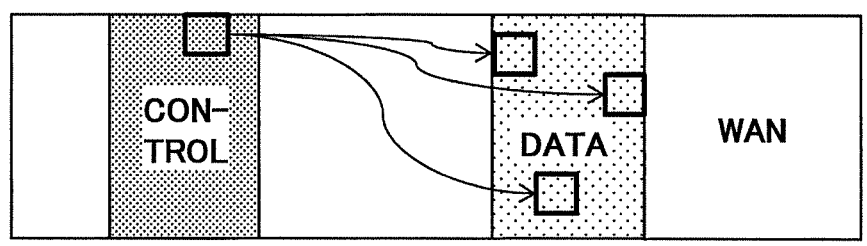

Also for "Communication", control/data transmission resource pools are periodically reserved as illustrated by FIG. 4B. The transmitting user device UE reports sidelink control information (SCI) including data transmission resources to the receiving user device UEb by using resources selected from the control resource pool, and transmits data using the data transmission resources. More specifically, there are Mode 1 and Mode 2 for "Communication". In Mode 1, resources are dynamically allocated via (E)PDCCH transmitted from the base station eNB to the user device UE. In Mode 2, the user device UEa autonomously selects transmission resources from the control/data transmission resource pools. The resource pools are reported via SIB or defined in advance.

In LTE, a channel used for "Discovery" is referred to as a physical sidelink discovery channel (PSDCH), a channel for transmitting control information such as SCI in "Communication" is referred to as a physical sidelink control channel (PSCCH), and a channel for transmitting data is referred to as a physical sidelink shared channel (PSSCH).

Figure 5:
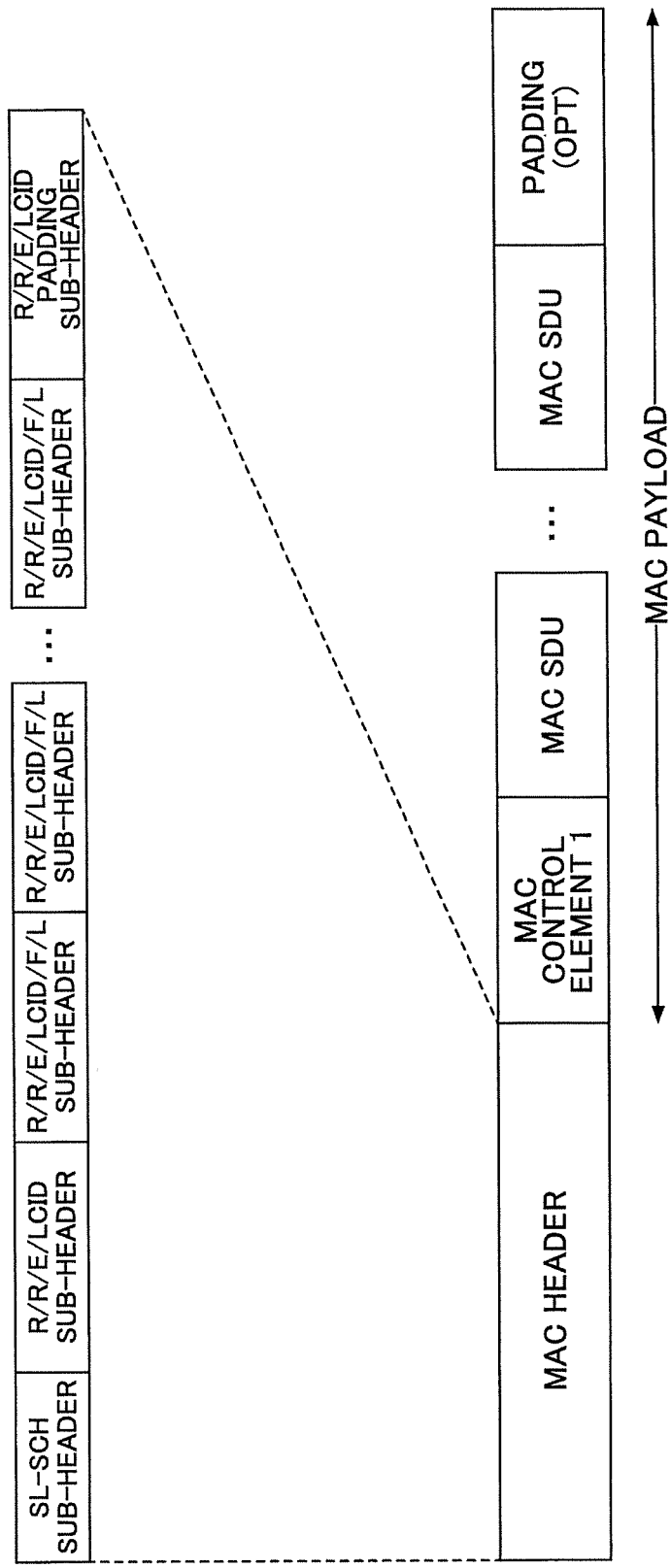
FIG. 5 is a drawing illustrating a MAC PDU used in D2D communication in accordance with embodiments of the invention.

As illustrated by FIG. 5, a medium access control (MAC) protocol data unit (PDU) used for D2D communication includes at least a MAC header, a MAC control element, a MAC service data unit (SDU), and padding. The MAC PDU may also include other types of information. The MAC header includes one sidelink shared channel (SL-SCH) subheader and one or more MAC PDU subheaders.

Figure 6:
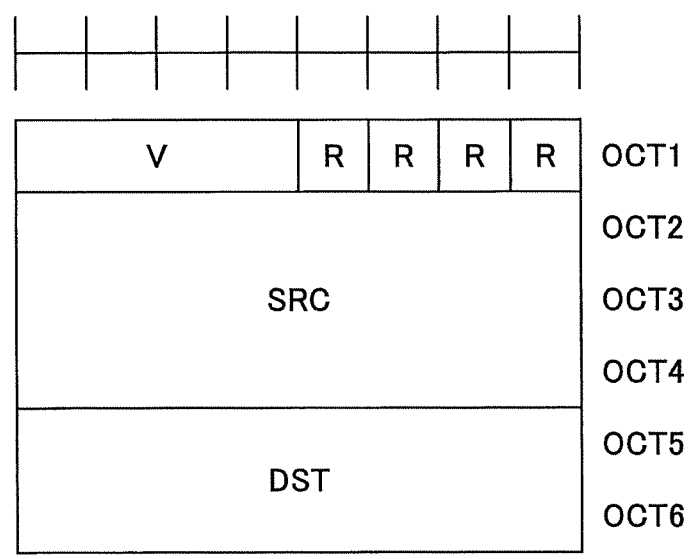
FIG. 6 is a drawing illustrating a format of an SL-SCH subheader in accordance with embodiments of the invention.

As illustrated by FIG. 6, the SL-SCH subheader includes a MAC PDU format version (V), source information (SRC), destination information (DST), and reserved bits (R). "V" is placed in the beginning of the SL-SCH subheader and indicates a MAC PDU format version used by the user device UE. The source information includes information on a sender. The source information may include an identifier of a ProSe UE ID. The destination information includes information on a destination. The destination information may include information on a ProSe Layer-2 Group ID of the destination.

Also in D2D, synchronization signals used mainly for synchronization between user devices UE located outside of the coverage of the base station eNB are defined. These synchronization channels are referred to as a primary sidelink synchronization signal (PSSS) and a secondary sidelink synchronization signal (SSSS). Also, a channel used mainly to report, for example, system information to a user device UE located outside of the coverage of the base station eNB is referred to as a physical sidelink broadcast control channel (PSBCH).

In the present embodiment, the user device UE may be a vehicle, a mobile terminal of a driver, or a mobile terminal of a pedestrian that is defined in V2X. Also, unless otherwise mentioned, an RSU defined in V2X may be the user device UE or the base station eNB of the present embodiment. Next, processes performed by the radio communication system of the present embodiment are described.

<Processes>

In the present embodiments, the transmitting user device UEa selects, based on its moving speed or an instruction from the base station eNB, whether to transmit a D2D signal by mapping a reference signal to a physical channel according to a related-art mapping configuration or to transmit a D2D signal by mapping a reference signal to a physical channel according to a mapping configuration suitable for high-speed movement, and transmits the D2D signal by mapping the reference signal to the physical channel according to the selected mapping configuration.

When receiving the D2D signal, the receiving user device UEb determines whether the reference signal is mapped to the physical channel according to the related-art mapping configuration or the reference signal is mapped to the physical channel according to the mapping configuration suitable for high-speed movement, and detects the reference signal based on the determination result to perform channel estimation.

Below, for descriptive purposes, the mapping configuration of a reference signal suitable for high-speed movement is referred to as a "new RS configuration" and the mapping configuration of a reference signal in the current D2D is referred to as a "related-art RS configuration".

(New RS Configurations)

Figure 1:
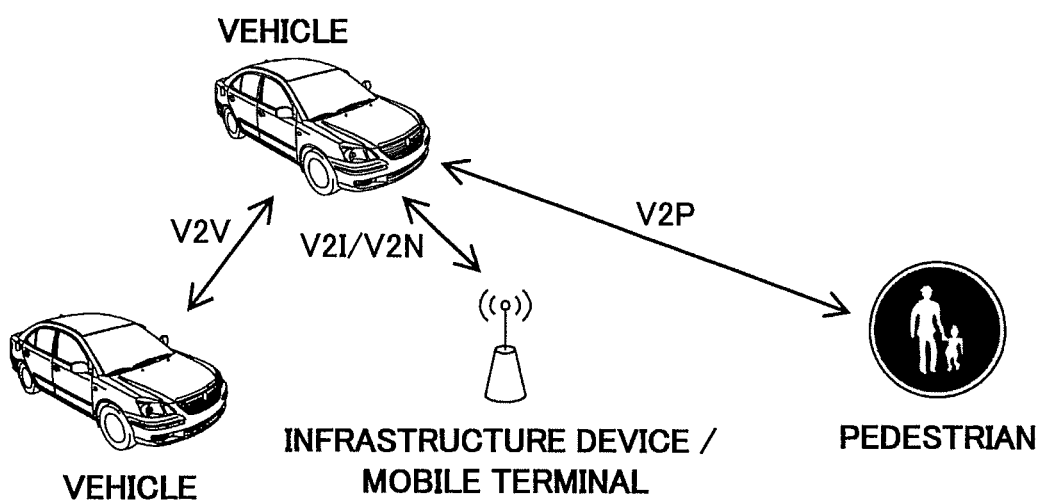
FIG. 1 is a drawing used to describe V2X.
Figure 2:
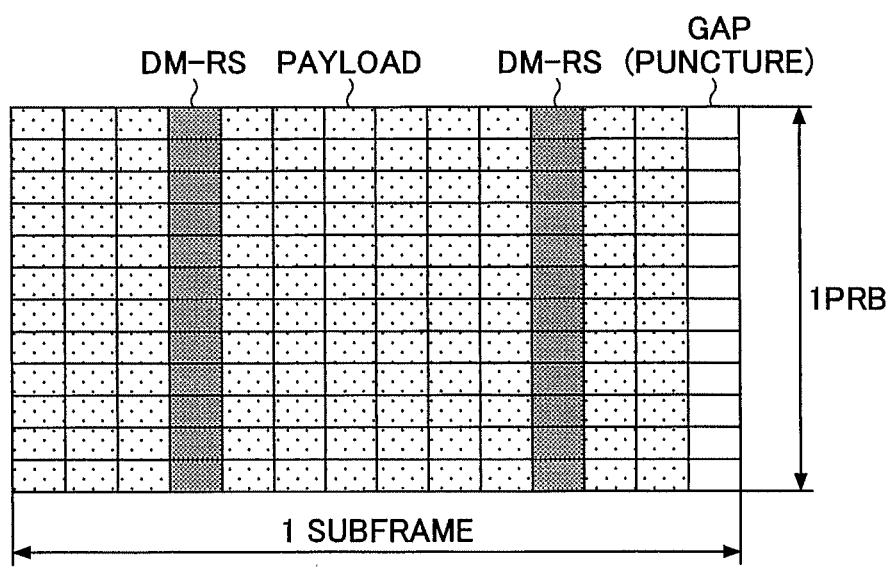
FIG. 2 is a drawing illustrating a related-art RS configuration.

In the present embodiments, configurations of a reference signal are newly defined to prevent the reduction in the channel estimation accuracy at the receiving user device UEb even when the user devices UE are moving at high speed. In the newly-defined configurations, the reference signal is mapped to more SC-FDMA symbols in one subframe than in the related-art configuration (FIG. 2).

Figure 7A:
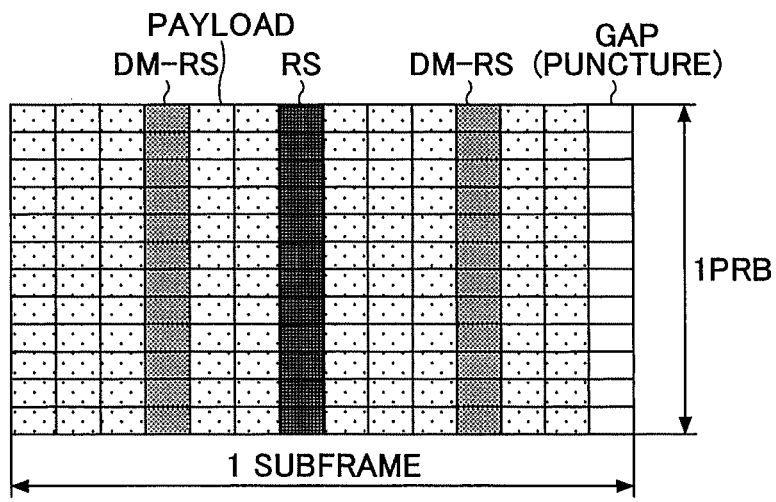
FIGS. 7A, 7B, and 7C are drawings illustrating examples of new RS configurations (in one subframe) in accordance with embodiments of the invention.
Figure 7B:
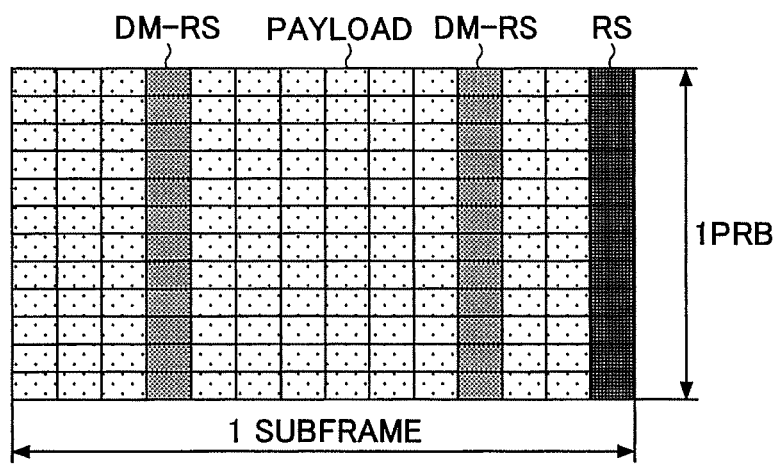
Figure 7C:
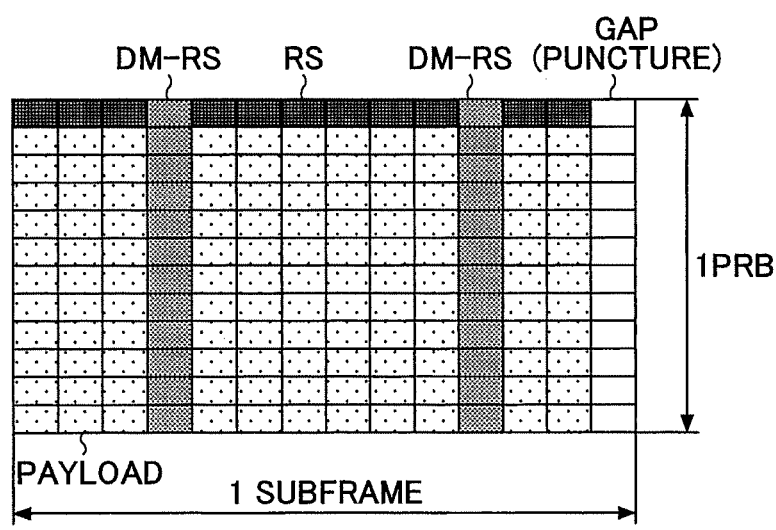

FIG. 7A illustrates an exemplary configuration where a reference signal (RS) is added to the last SC-FDMA symbol in the first slot. FIG. 7B illustrates an exemplary configuration where the reference signal (RS) is added to the last SC-FDMA symbol in the last slot. FIG. 7C illustrates an exemplary configuration where the reference signal is added to the entire range of a specific subcarrier in one Physical Resource Block (PRB).

Figure 8A:
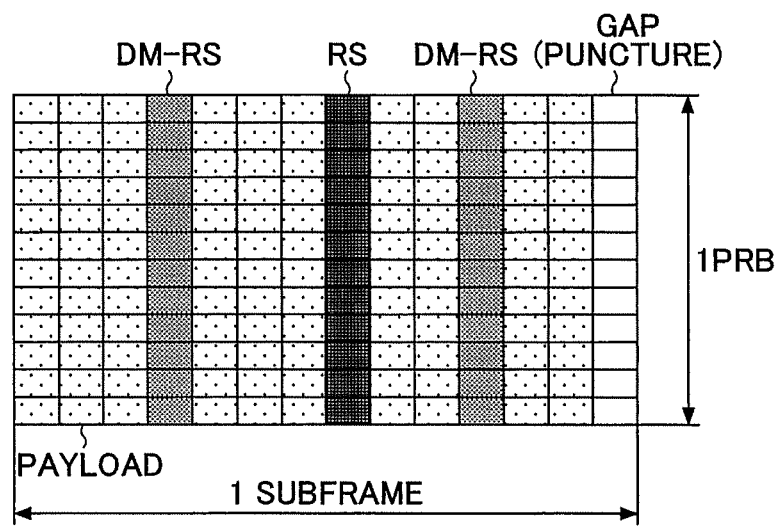
FIGS. 8A and 8B are drawings illustrating examples of new RS configurations (in one subframe) in accordance with embodiments of the invention.
Figure 8B:
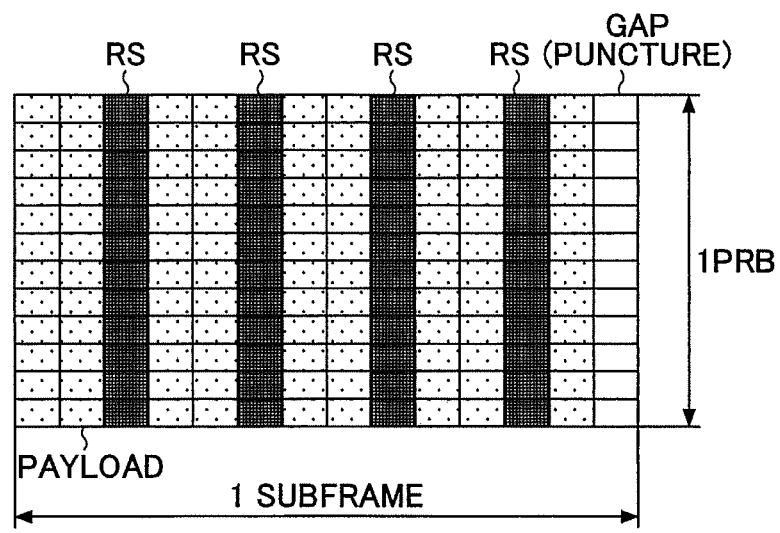

FIG. 8A illustrates an exemplary configuration where the reference signal (RS) is added to the first SC-FDMA symbol in the second slot in one subframe. FIG. 8B illustrates an exemplary configuration where the reference signal (RS) is mapped to four SC-FDMA symbols in one subframe.

Figure 9A:
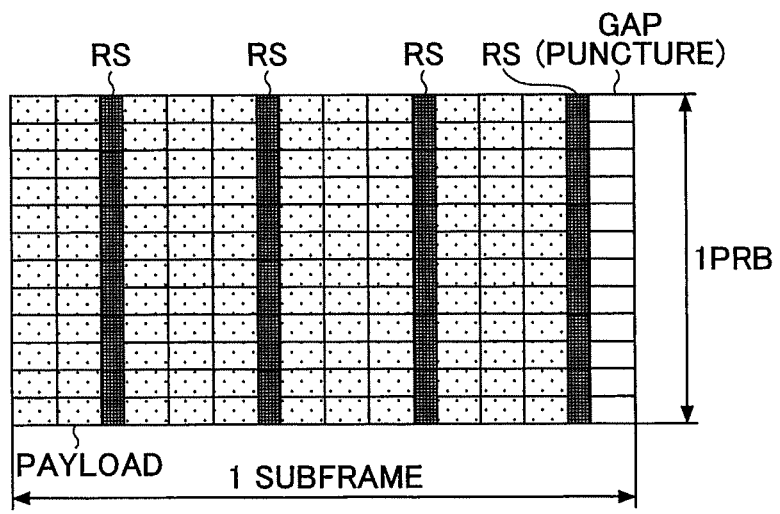
FIGS. 9A, 9B, and 9C are drawings illustrating examples of new RS configurations (in one subframe) in accordance with embodiments of the invention.
Figure 9B:
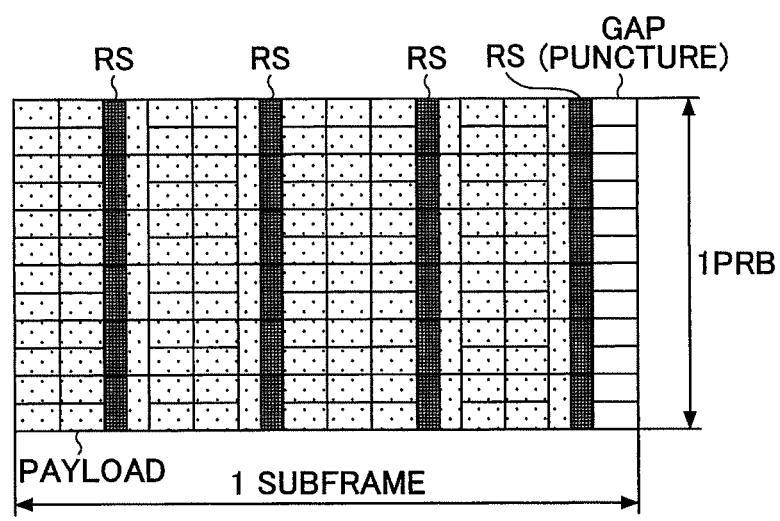
Figure 9C:
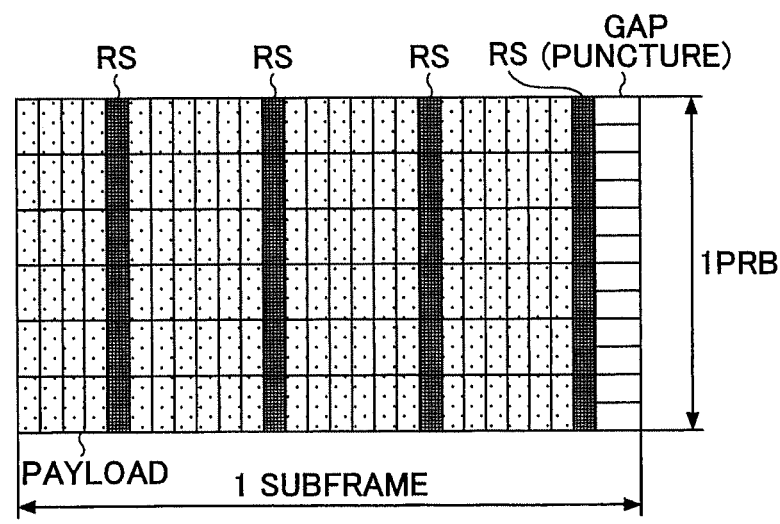

FIG. 9A illustrates an exemplary configuration where the reference signal (RS) is mapped to four SC-FDMA symbols in one subframe, and the length of each of the SC-FDMA symbols to which the reference signal is mapped is halved. FIG. 9B illustrates an exemplary configuration where the reference signal (RS) is mapped to four SC-FDMA symbols in one subframe, and the length of each of the SC-FDMA symbols to which the reference signal is mapped and SC-FDMA symbols adjacent to those SC-FDMA symbols is halved. FIG. 9C illustrates an exemplary configuration where the reference signal (RS) is mapped to four SC-FDMA symbols in one subframe, and the length of all SC-FDMA symbols in one subframe is halved.

Figure 10:
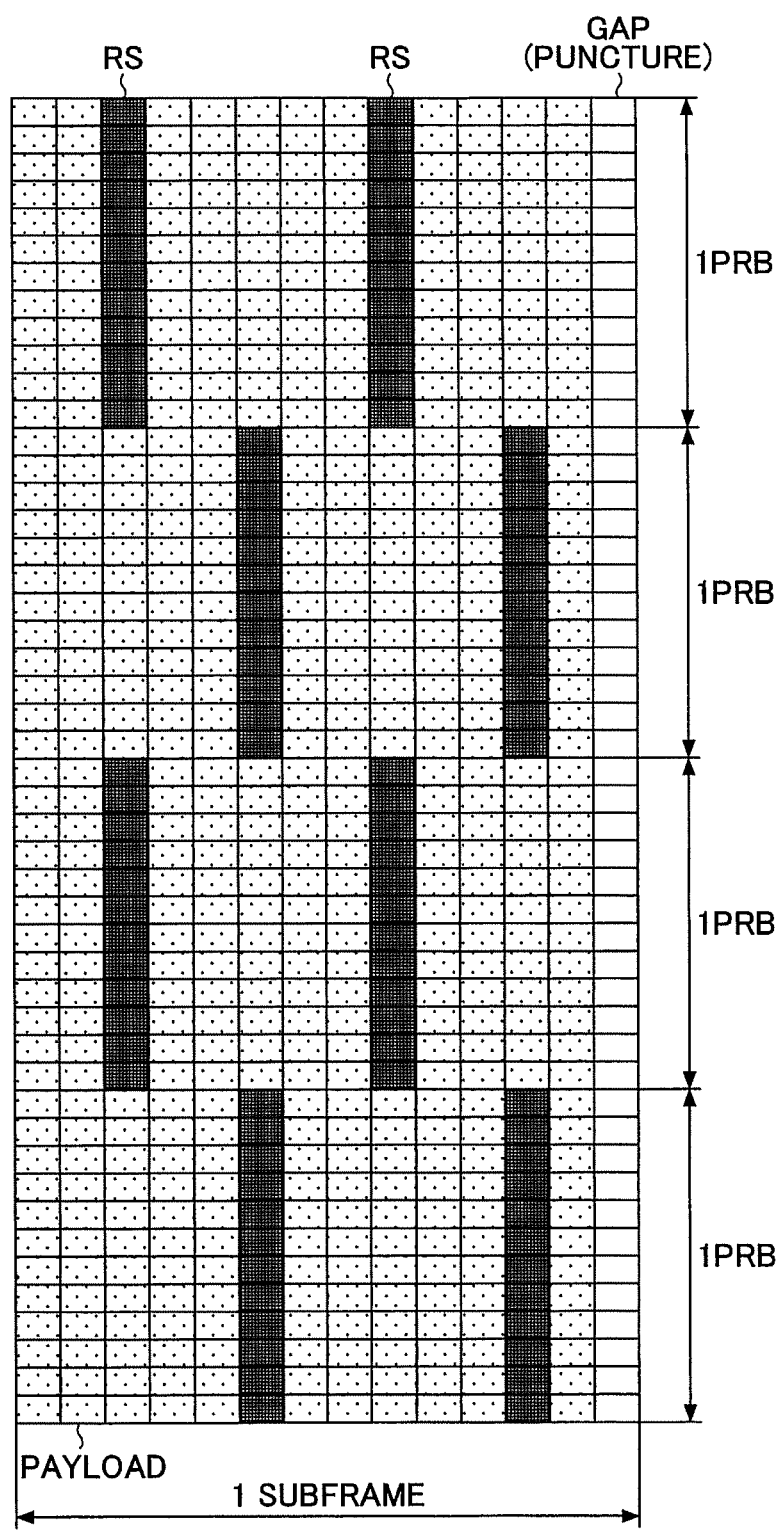
FIG. 10 is a drawing illustrating an example of a new RS configuration (in one subframe) in accordance with embodiments of the invention.

FIG. 10 illustrates an exemplary configuration where the positions of the reference signal (RS) are alternately changed from one resource block (RB) to another.

The reference signal added in FIGS. 7A through 10 may be DM-RS, a sounding reference signal (SRS), or a reference signal including a newly-defined sequence. Also, in FIG. 7C, a reference signal including a sequence using consecutive SC-FDMA symbols may be newly defined. Also, the mapping configurations of the reference signal illustrated by FIGS. 7A through 10 are just examples, and any other mapping configuration may also be used as long as a reference signal (RS) is mapped to more SC-FDMA symbols than in the related-art DM-RS mapping configuration. Although DM-RSs are time-division multiplexed in the example, all reference signals may be frequency-division multiplexed.

In the present embodiment, reference signals arranged as in FIGS. 7A through 10 may be mapped to the entire physical channel (e.g., PSCCH, PSCCH, PSSCH, or PSBCH) used in D2D.

Figure 11B:
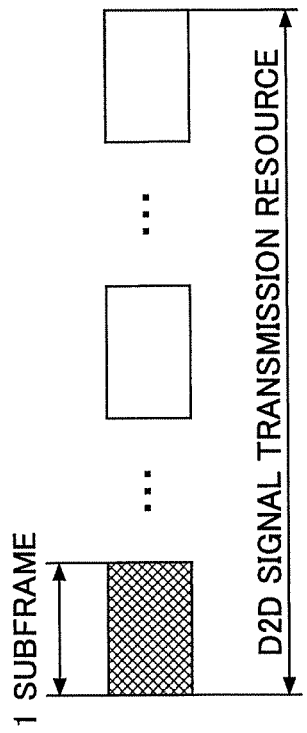
FIGS. 11A and 11B are drawings illustrating an example of a new RS configuration (in the entire physical channel) in accordance with embodiments of the invention.
Figure 11A:
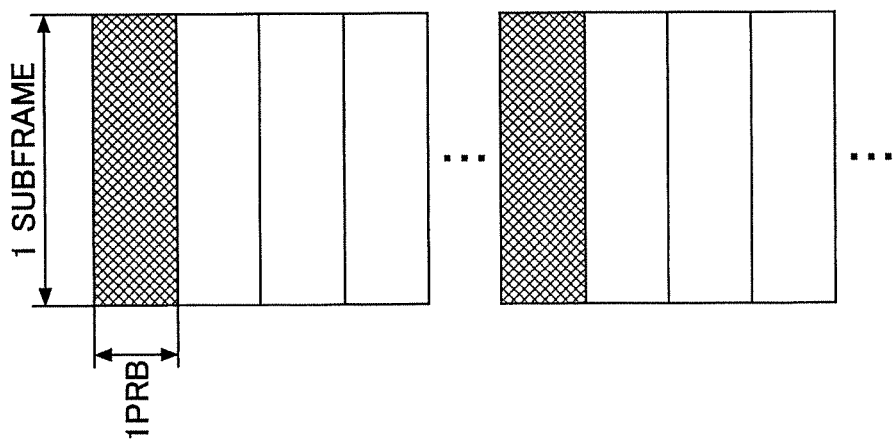

Also, reference signals arranged as in FIGS. 7A through 10 may be mapped only to a part of a physical channel according to a predetermined rule. For example, in a physical channel composed of multiple PRBs in the frequency domain (e.g., PSBCH is composed of six PRBs), reference signals arranged as in FIGS. 7A through 10 may be mapped to one of N (N is an integer) PRBs as illustrated by FIG. 11A. Also, in a physical channel composed of multiple PRBs in the time domain (e.g., PSSCH is composed of multiple PRBs in the time domain to repeatedly transmit MAC PDU), reference signals arranged as in FIGS. 7A through 10 may be mapped to the first (or last) PRB as illustrated by FIG. 11B. Compared with a case where reference signals arranged as in FIGS. 7A through 10 are mapped to the entire physical channel, the method of FIGS. 11A and 11B makes it possible to prevent the reduction in the throughput and the error correction performance.

In the example of FIG. 10, in each resource block, the number of data symbols used and resource element (RE) mapping except symbol shifting are substantially the same as those in Rel-12 D2D. Still, the example of FIG. 10 makes it possible to complement a channel estimation result in the frequency domain and effectively improve the tolerance to the Doppler frequency.

Also, in a new RS configuration, without changing the related-art RS configuration, a shorter OFDM symbol length that is shorter than the OFDM symbol length used in the current D2D (LTE) may be used (which is equivalent to increasing the subcarrier spacing) so that the length of one transmission time interval (TTI) becomes shorter. This practically decreases the time interval between DM-RSs, and achieves reference signal mapping that is suitable for high-speed movement.

(Reference Signal Parameters in New Rs Configurations)

In the present embodiments, when generating reference signals in a new RS configuration, parameters different from the parameters defined in the current D2D may be used. FIG. 12 illustrates reference signal parameters defined in the current D2D, and FIG. 13 illustrates examples of reference signal parameters used for physical channels having a new RS configuration. FIG. 13 is just an example, and other parameters may also be used. According to one or more embodiments, "3GPP TS 36.211 version 12.6.0 Release 12" (for example, in section 3.1 on page 10, section 5.5.1.3 on page 36, and section 5.5.1.5 on page 37), provides descriptions for the group hopping parameters shown in FIGS. 12 and 13.

In V2X, it is assumed that communications are performed in an environment where many vehicles exist, and therefore it is expected that the possibility of interference between user devices UE is high. Also, in the current D2D, because reference signal parameters for PSSCH and PSDCH are mostly fixed values, the interference between user devices UE may cause performance degradation (or reduce the channel estimation accuracy). For these reasons, parameters different from those used in the current D2D may be used in generating reference signals in a new RS configuration and different parameters may be used by different transmitting user devices UEa employing a new RS configuration so that the interference between user devices UE is randomized, reference signals are orthogonalized between user devices UE, and performance degradation due to interference can be prevented.

(Transmission and Reception of D2D Signal)

Next, processes for transmitting and receiving a D2D signal performed by the transmitting and receiving user devices UE are described. As described above, there are various types of reference signal mapping configurations according to new RS configurations and various parameters used in generating reference signals. Below, it is assumed that a reference signal mapping configuration according to a new RS configuration and parameters used in generating reference signals are shared between (obtainable or computable by) the transmitting user device UEa and the receiving user device UEb implicitly or using some information as a trigger.

[Process Performed by Transmitting User Device]

FIG. 14 is a flowchart illustrating an exemplary process performed by a transmitting user device. A process performed by the transmitting user device UEa to transmit a D2D signal via a physical channel is described with reference to FIG. 14.

At step S11, the user device UEa selects one of "related-art RS configuration" and "new RS configuration" used to transmit a D2D signal via a physical channel. When "related-art RS configuration" is selected, the process proceeds to step S12. On the other hand, when "new RS configuration" is selected, the process proceeds to step S13.

For example, the user device UEa may be configured to obtain the moving speed of the user device UEa itself from, for example, a speed sensor or a GPS, to select "related-art RS configuration" when the obtained moving speed is less than or equal to a predetermined threshold, and to select "new RS configuration" when the obtained moving speed is greater than the predetermined threshold. Here, "new RS configuration" needs to be selected when the relative speed between the transmitting user device UEa and the receiving user device UEb is very high. Therefore, when the moving speed of the transmitting user device UEa is low, it is presumed that transmitting the D2D signal with "related-art RS configuration" does not cause a significant problem regardless of the moving speed of the receiving user device UEb.

As another exemplary method, the user device UEa may be configured to pre-store information indicating positions where "new RS configuration" needs to be selected, and to select one of "related-art RS configuration" and "new RS configuration" based on a result of comparing its position obtained from, for example, a Global Positioning System (GPS) with the pre-stored information. The information indicating positions where "new RS configuration" needs to be selected may be preset in a subscriber identity module (SIM), or reported via an upper-layer control signal transmitted from a core network.

As still another exemplary method, the user device UEa may be configured to select one of "related-art RS configuration" and "new RS configuration" according to an instruction from the base station eNB (or RSU). The base station eNB (or RSU) may be configured to send an instruction separately to each user device UEa using an RRC signal or a layer 1/layer 2 control signal, or to send an instruction to all user devices UE using broadcast information (SIB). Here, it is assumed that the relative speed between the transmitting user device UEa and the receiving user device UEb becomes very high in limited areas such as expressways. Therefore, information requesting to select "new RS configuration" may be included in broadcast information transmitted from a base station eNB forming an area including an expressway, and information requesting to select "related-art RS configuration" may be included in broadcast information transmitted from a base station eNB forming an area including no expressway. Further, information requesting to select "new RS configuration" may be transmitted from an RSU installed at an entrance of an expressway to a user device UE passing through the entrance by using a layer 1/layer 2 control signal or an RRC signal, and information requesting to select "related-art RS configuration" may be transmitted from an RSU installed at an exit of the expressway to a user device UE passing through the exit by using a layer 1/layer 2 control signal or an RRC signal.

At step S12, the user device UEa generates and transmits a D2D signal with the related-art RS configuration.

At step S13, the user device UEa generates and transmits a D2D signal with the new RS configuration. When one of the RS configurations illustrated by FIG. 7C, FIG. 10, and FIG. 11A is used, the user UEa transmits both a reference signal and a signal included in the payload in the same symbol. In other words, unlike in the current D2D (single carrier transmission), the user device UEa performs multi-carrier transmission. It is known that the peak to average power ratio (PAPR) in multi-carrier transmission is generally higher than the PAPR in single carrier transmission. Therefore, the user device UEa may be configured to set the backoff value necessary for a power amplifier at a high value taking into account the PAPR. To reduce the influence of an increase in the PAPR, the configuration involving multi-carrier transmission may be limited to Quadrature Phase-Shift Keying (QPSK) modulation, or the allocation of applicable resources such as a transmission bandwidth may be limited so that the PAPR is reduced. Further, instead of the related-art SC-FDMA, Orthogonal Frequency Division Multiplexing (OFDM) may be used to transmit the D2D signal (such that the signal waveform becomes OFDM).

Here, it is defined that PSBCH is transmitted using radio resources encompassing six PRBs in the frequency domain and one subframe in the time domain, and PSCCH (SCI) is transmitted using radio resources encompassing one PRB. When the D2D signal transmitted at step S13 is PSBCH or PSCCH, the user device UEa may be configured to secure a data size transmittable via PSBCH or PSCCH and achieve a predetermined code rate by, for example, applying a high-density modulation scheme and thereby increasing the number of bits transmittable in the payload.

Also, two or more parameter sets may be prepared for reference signal parameters to be applied to PSCCH, and the user device UEa may be configured to select one of the parameter sets autonomously or according to an instruction from the base station eNB.

Also, two or more parameter sets may be prepared for reference signal parameters to be applied to PSSCH, and the user device UEa may be configured to select one of the parameter sets autonomously or according to an instruction from the base station eNB. Each of the parameter sets may be uniquely identified based on sidelink synchronization identity (SLID) or sidelink group destination identity (SAID). SAID is an identifier indicating a destination user device UE.

Also, the user device UEa may be configured to include an identifier indicating a used parameter set in SCI. The identifier may be a newly-defined identifier or a broadcast ID included in SAID.

As another method, instead of selecting one of predefined parameter sets, the user device UEa may calculate reference signal parameters to be applied to PSSCH based on set values included in SCI. For example, the user device UEa may be configured to generate parameters based on values obtained by inputting all or a part of set values (e.g., frequency hopping flag, time resource pattern, MCS, TA, and SAID) included in SCI into a hash function. This configuration eliminates the need for the user device UEa to perform a process for selecting a parameter set. Also, because parameters for generating a reference signal change as the set values in SCI change, this configuration makes it possible to randomize interference.

[Process Performed by Receiving User Device]

FIGS. 15A and 15B are flowcharts illustrating exemplary processes performed by a receiving user device. Processes performed by the receiving user device UEb to receive a D2D signal via a physical channel are described with reference to FIGS. 15A and 15B.

FIG. 15A illustrates a process performed when the receiving user device UEb cannot determine whether a D2D signal with "related-art RS configuration" is received or a D2D signal with "new RS configuration" is received. FIG. 15B illustrates a process performed when the receiving user device UEb can determine whether a D2D signal with "related-art RS configuration" is received or a D2D signal with "new RS configuration" is received. First, the process of FIG. 15A is described.

At step S21, the user device UEb assumes that the reference signal in the received D2D signal is mapped according to "related-art RS configuration", and tries to detect the reference signal (perform blind detection) according to a method similar to that used in the current D2D.

When it is determined at step S22 that the reference signal has been detected, the user device UEb performs channel estimation using the detected reference signal and terminates the process. When it is determined at step S22 that the reference signal has not been detected, the user device UEb proceeds to step S23.

At step S23, the user device UEb detects the reference signal based on an assumption that the reference signal in the received D2D signal is mapped according to "new RS configuration". Then, the user device UEb performs channel estimation using the detected reference signal and terminates the process.

More specifically, the user device UEb generates a replica of the reference signal using parameters that are the same as the parameters used by the transmitting user device UEa to generate the reference signal according to "new RS configuration", and performs channel estimation by comparing the generated replica with the actually-received reference signal.

Also, the user device UEb may be configured to identify a parameter set used by the transmitting user device UEa from multiple parameter sets. For example, the user device UEb may be configured to identify the parameter set based on SLID or SAID or to identify the parameter set based on an "identifier indicating a used parameter set" included in SCI as described above.

Also, the user device UEb may be configured to generate parameters that are the same as the parameters used by the transmitting user device UEa based on values obtained by inputting set values included in SCI into a hash function.

Next, the process of FIG. 15B is described.

At step S31, the user device UEb determines whether "related-art RS configuration" or "new RS configuration" is applied to the reference signal included in the received D2D signal. When it is determined that "related-art RS configuration" is applied to the reference signal, the user device UEb proceeds to step S32. On the other hand, when it is determined that "new RS configuration" is applied to the reference signal, he user device UEb proceeds to step S33.

The user device UEb may be configured to determine whether "related-art RS configuration" or "new RS configuration" is applied to the reference signal by comparing the "information indicating positions where 'new RS configuration' needs to be selected" described at step S11 of FIG. 14 with the position of the user device UEb obtained from, for example, a GPS. In V2X, it is assumed that user devices UE are located close to each. Therefore, it is possible to accurately perform the determination of step S31 even by comparing the "information indicating positions where 'new RS configuration' needs to be selected" with the position of the user device UEb itself. As another exemplary method, as described at step S11 of FIG. 14, the user device UEb may be configured to determine whether "related-art RS configuration" or "new RS configuration" is applied to the reference signal based on an instruction from the base station eNB (or RSU). Also, when the user device UE is located outside of the coverage of the base station and cannot receive the instruction from the base station, the user device UE may be configured to use a fixed RS configuration (e.g., new RS configuration) to prevent an error in determining an RS configuration.

Also, the user device UEb is supposed to receive PSCCH before receiving PSSCH. Therefore, the user device UEb may determine whether "related-art RS configuration" or "new RS configuration" is applied to the reference signal included in PSSCH based on the result of determining the RS configuration of the reference signal included in PSCCH. That is, when it is determined that "related-art RS configuration" is applied to the reference signal included in PSCCH, the user device UEb may determine that "related-art RS configuration" is also applied to the reference signal included in PSSCH. On the other hand, when it is determined that "new RS configuration" is applied to the reference signal included in PSCCH, the user device UEb may determine that "new RS configuration" is also applied to the reference signal included in PSSCH.

Similarly, because PSBCH is transmitted periodically (every 40 ms), the user device UEb may be configured to determine RS configurations of other physical channels (PSCCH, PSSCH, and PSDCH) based on the result of determining the RS configuration of the reference signal included in PSBCH. That is, when it is determined that "related-art RS configuration" is applied to the reference signal included in PSBCH, the user device UEb may determine that "related-art RS configuration" is also applied to reference signals included in PSCCH, PSSCH, and PSDCH. On the other hand, when it is determined that "new RS configuration" is applied to the reference signal included in PSBCH, the user device UEb may determine that "new RS configuration" is also applied to reference signals included in PSCCH, PSSCH, and PSDCH. Also, the sequence of SLSS or the symbol mapping (e.g., symbol interval) of PSSS/SSSS may be changed depending on RS configurations to determine RS configurations of other physical channels (PSBCH, PSCCH, PSSCH, and PSDCH).

At step S32, the user device UEb detects the reference signal according to a method similar to that used in the current D2D. Then, the user device UEb performs channel estimation using the detected reference signal and terminates the process.

Step S33 is substantially the same as step S23 of FIG. 15A, and therefore the description of step S33 is omitted.

<Functional Configurations>

Examples of functional configurations of the user device UE and the base station eNB that perform the above processes are described below.

(User Device)

Figure 16:
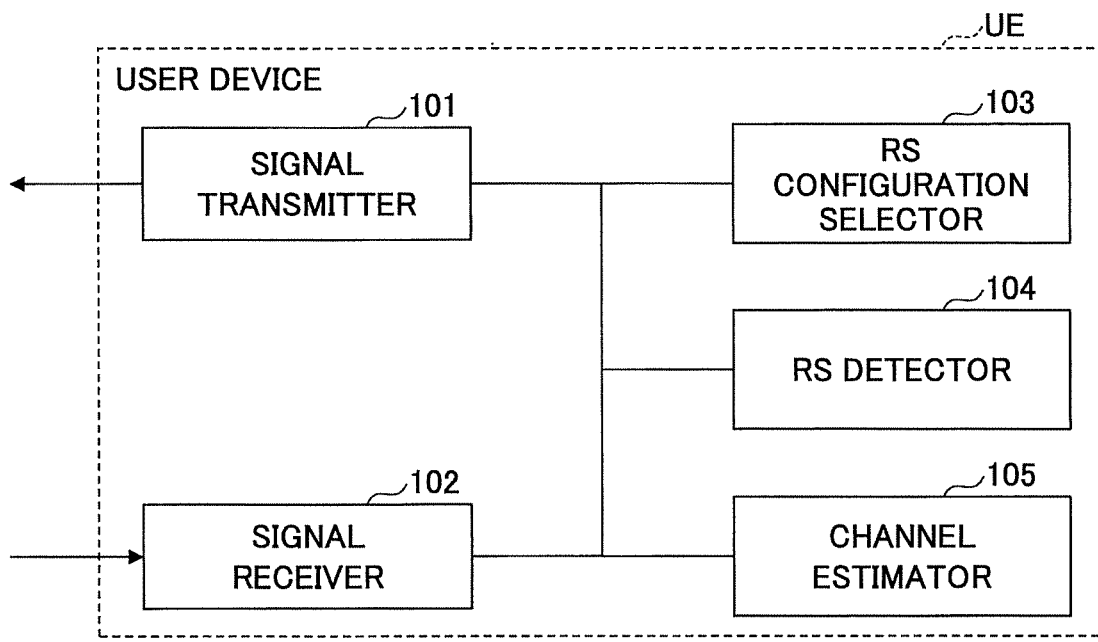
FIG. 16 is a drawing illustrating an example of a functional configuration of a user device in accordance with embodiments of the invention.

FIG. 16 is a drawing illustrating an example of a functional configuration of a user device according to one or more embodiments. As illustrated by FIG. 16, the user device UE includes a signal transmitter 101, a signal receiver 102, an RS configuration selector 103, an RS detector 104, and a channel estimator 105. FIG. 16 illustrates only functional components of the user device UE that are particularly relevant to the present embodiment, and the user device US may also at least include unshown functional components that are necessary for operations conforming to LTE. Also, the functional configuration of FIG. 16 is just an example. As long as operations related to the present embodiment can be performed, the categorization and the names of the functional components may be freely changed.

The signal transmitter 101 generates various physical layer signals from upper layer signals to be transmitted from the user device UE, and wirelessly transmits the physical layer signals. The signal transmitter 101 also includes a function to transmit a D2D signal and a transmission function for cellular communication. Also, based on a selection result of the RS configuration selector 103, the signal transmitter 101 maps a reference signal to a physical channel (e.g., PSDCH, PSCCH, PSSCH, or PSBCH) according to the related-art RS configuration or the new RS configuration, and transmits a D2D signal. Also, when mapping a reference signal to a physical channel according to the new RS configuration, the signal transmitter 101 may generate the reference signal using parameters different from those of a related-art reference signal. Also, when transmitting a D2D signal by applying the new PS configuration to PSSCH, the signal transmitter 101 may generate parameters for generating a reference signal mapped to PSSCH based on information included in SCI.

The signal receiver 102 includes functions to wirelessly receive various signals from other user devices UE or the base station eNB, and obtain upper layer signals from the received physical layer signals. The signal receiver 102 also includes a function to receive a D2D signal and a reception function for cellular communication.

The RS configuration selector 103 includes a function to select whether to transmit a D2D signal by mapping a reference signal to a physical channel according to the related-art RS configuration or to transmit a D2D signal by mapping a reference signal to a physical channel according to the new RS configuration. Also, the RS configuration selector 103 may be configured to select to transmit a D2D signal by mapping a reference signal to a physical channel according to the related-art RS configuration when the moving speed of the user device UE is less than or equal to a predetermined threshold, and to select to transmit a D2D signal by mapping a reference signal to a physical channel according to the new RS configuration when the moving speed of the user device UE is greater than the predetermined threshold. The RS configuration selector 103 may be configured to detect the moving speed of the user device UE based on information from, for example, a speed sensor or a GPS.

Also, the RS configuration selector 103 may be configured to select whether to transmit a D2D signal by mapping a reference signal to a physical channel according to the related-art RS configuration or to transmit a D2D signal by mapping a reference signal to a physical channel according to the new RS configuration, based on the position (e.g., the current position) of the user device UE or an instruction from the base station eNB.

When a D2D signal is received by the signal receiver 102, the RS detector 104 determines whether a reference signal is mapped to a physical channel in the received D2D signal according to the related-art RS configuration or the new RS configuration, and detects the reference signal based on the determination result.

Also, when it is determined that a reference signal is mapped to a specific physical channel such as PSBCH or PSCCH according to the related-art RS configuration, the RS detector 104 may determine that a reference signal in a physical channel other than the specific physical channel is also mapped according to the related-art RS configuration; and when it is determined that the reference signal is mapped to the specific physical channel according to the new RS configuration, the RS detector 104 may determine that a reference signal in a physical channel other than the specific physical channel is also mapped according to the new RS configuration.

The channel estimator 105 performs channel estimation using the reference signal detected by the RS detector 104. More specifically, the channel estimator 105 generates a replica of the reference signal using parameters that are used by the transmitting user device UE to generate the reference signal, and performs channel estimation by comparing the generated replica with the reference signal detected by the RS detector 104.

Also, when the new RS configuration is applied to PSSCH, the channel estimator 105 may identify parameters used to generate the reference signal mapped to PSSCH based on information included in SCI, and perform channel estimation by using the identified parameters.

(Base Station)

Figure 17:
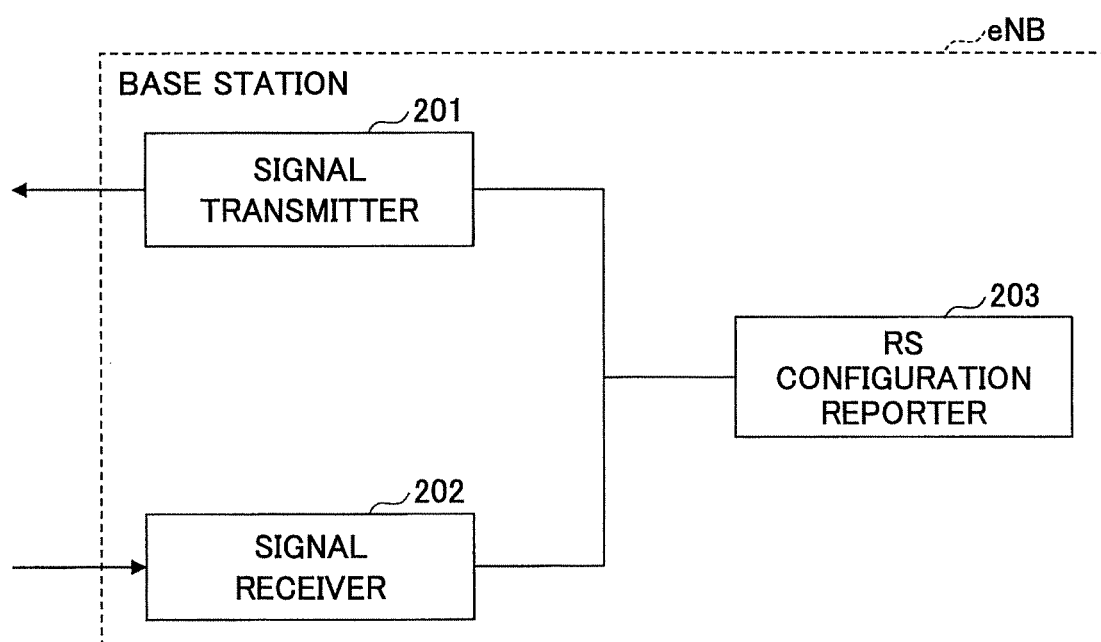
FIG. 17 is a drawing illustrating an example of a functional configuration of a base station in accordance with embodiments of the invention.

FIG. 17 is a drawing illustrating an example of a functional configuration of a base station according to one or more embodiments. As illustrated by FIG. 17, the base station eNB includes a signal transmitter 201, a signal receiver 202, and an RS configuration reporter 203. FIG. 17 illustrates only functional components of the base station eNB that are particularly relevant to the present embodiment, and the base station eNB may also at least include unshown functional components that are necessary for operations conforming to LTE. Also, the functional configuration of FIG. 17 is just an example. As long as operations related to the present embodiments can be performed, the categorization and the names of the functional components may be freely changed.

The signal transmitter 201 includes a function to generate various physical layer signals from upper layer signals to be transmitted from the base station eNB, and to wirelessly transmit the physical layer signals. The signal receiver 202 includes a function to wirelessly receive various signals from the user devices UE, and obtain upper layer signals from the received physical layer signals.

The RS configuration reporter 203 reports information requesting to use one of the related-art configuration and the new RS configuration via an RRC signal, broadcast information (SIB), or a layer 1/layer 2 control signal to the user device UE.

<Hardware Configuration>

The block diagrams (FIGS. 16 and 17) used in the above descriptions illustrate functional blocks. Those functional blocks (components) may be implemented by hardware, software, or the combination of hardware and software. The functional blocks may be implemented by any appropriate means. That is, each functional block may be implemented by one apparatus that is physically and/or logically integrated, or by two or more physically and/or logically separated apparatuses that are directly and/or indirectly connected (via lines and/or wirelessly) to each other.

Figure 18:
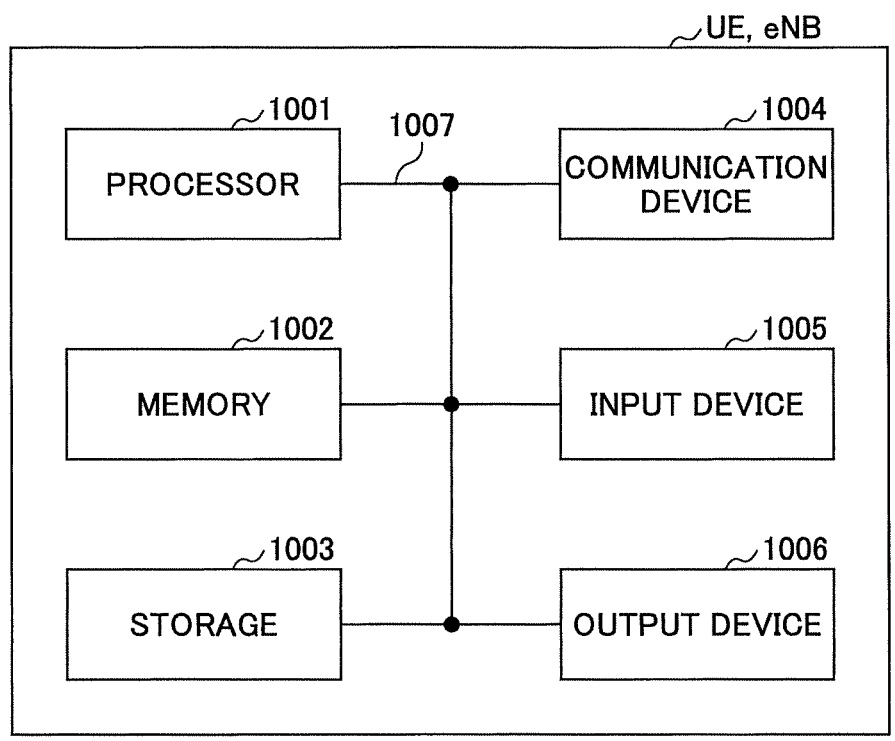
FIG. 18 is a drawing illustrating an example of a hardware configuration of each of a base station and a user device in accordance with embodiments of the invention.

For example, the base station eNB and the user device UE of the present embodiment may be implemented by computers that perform signal reception methods of the embodiments of the present invention. FIG. 18 is a drawing illustrating an example of a hardware configuration of each of a base station and a user device according to one or more embodiments. Physically, each of the base station eNB and the user device UE may be implemented by a computer including a processor 1001, a memory 1002, a storage 1003, a communication device 1004, an input device 1005, an output device 1006, and a bus 1007.

In the descriptions below, the term "device" may be replaced with, for example, "circuit", "module", or "unit". The hardware configuration of the base station eNB and the user device UE may include one or more components illustrated in FIG. 18 and may not necessarily include all of the components.

Functions of the base station eNB and the user device UE may be implemented by loading software (programs) into hardware components such as the processor 1001 and the memory 1002, executing the loaded software by the processor 1001, and thereby controlling communications performed by the communication device 1004 and data read/write operations of the memory 1002 and the storage 1003.

The processor 1001, for example, runs an operating system to control the entire computer. The processor 1001 may be implemented by a central processing unit (CPU) that includes interfaces with peripheral devices, a controller, an arithmetic unit, and registers. For example, the signal transmitter 101, the signal receiver 102, the RS configuration selector 103, the RS detector 104, and the channel estimator 105 of the user device UE and the signal transmitter 201, the signal receiver 202, and the RS configuration reporter 203 of the base station eNB may be implemented by the processor 1001.

The processor 1001 loads programs (program code), software modules, and data from the storage 1003 and/or the communication device 1004 into the memory 1002, and performs various processes according to the loaded programs, software modules, and data. The programs cause the computer to perform at least a part of the processes described in the above embodiments. For example, the signal transmitter 101, the signal receiver 102, the RS configuration selector 103, the RS detector 104, and the channel estimator 105 of the user device UE and the signal transmitter 201, the signal receiver 202, and the RS configuration reporter 203 of the base station eNB may be implemented by control programs loaded into the memory 1002 and executed by the processor 1001. Other functional blocks may also be implemented in a similar manner. The processes described above may be performed by one processor 1001 or may be performed concurrently or sequentially by two or more processors 1001. The processor 1001 may be implemented by one or more chips. The programs may be received from a network via a telecommunication line.

The memory 1002 is a computer-readable storage medium and may be implemented by, for example, at least one of a read-only memory (ROM), an erasable programmable ROM (EPROM), an electrically-erasable programmable ROM (EEPROM), and a random access memory (RAM). The memory 1002 may also be referred to as a register, a cache, or a main memory. The memory 1002 can store programs (program code) and software modules that are executable to perform signal reception methods of the embodiments.

The storage 1003 is a computer-readable storage medium and may be implemented by, for example, at least one of an optical disk such as a compact-disk ROM (CD-ROM), a hard disk drive, a flexible disk, a magneto-optical disk (e.g., a compact disk, a digital versatile disk, or a Blu-ray (registered trademark) disc), a smart card, a flash memory (e.g., a card drive, a stick drive, or a key drive), a floppy (registered trademark) disk, and a magnetic strip. The storage 1003 may also be referred to as a secondary storage. The storage medium described above may also be implemented by any other appropriate medium such as a database or a server that includes the memory 1002 and/or the storage 1003.

The communication device 1004 is a hardware component (transceiver device) for communicating with other computers via a wired network and/or a wireless network. The communication device 1004 may also be referred to as a network device, a network controller, a network card, or a communication module. For example, the signal transmitter 101 and the signal receiver 102 of the user device DE and the signal transmitter 201 and the signal receiver 202 of the base station eNB may be implemented by the communication device 1004.

The input device 1005 receives external inputs and may be implemented by, for example, one or more of a keyboard, a mouse, a microphone, switches, buttons, and sensors. The output device 1006 is an external output device (e.g., a display, a speaker, and/or an LED lamp). The input device 1005 and the output device 1006 may be implemented as a single component (e.g., a touch panel).

The above-described devices including the processor 1001 and the memory 1002 are connected to each other via a bus 1007 for communication. The bus 1007 may be implemented by a single bus, or may be implemented by multiple buses connecting the corresponding devices.

Each of the base station eNB and the user device UE may include hardware components such as a microprocessor, a digital signal processor (DSP), an application specific integrated circuit (ASIC), a programmable logic device (PLD), and/or a field programmable gate array (FPGA), and some or all of the functional blocks may be implemented by these hardware components. For example, the processor 1001 may be implemented by at least one of these hardware components

SUMMARY

One or more embodiments of the present invention provide a user device for a radio communication system supporting D2D communication. The user device includes a transmitter that transmits a D2D signal by mapping a reference signal to a physical channel according to a first mapping configuration or according to a second mapping configuration where the reference signal is mapped to more symbols than in the first mapping configuration. When transmitting the D2D signal by applying the second mapping configuration to a PSSCH, the transmitter generates parameters for generating the reference signal to be mapped to the PSSCH based on information included in a PSCCH. This configuration makes it possible to properly change the mapping of a reference signal in a radio communication system supporting D2D. Also, this configuration eliminates the need for the user device UE to perform a process for selecting a parameter set, and thereby makes it possible to reduce the processing load of the user device UE. Further, because parameters for generating a reference signal change as the set values in PSCCH change, this configuration makes it possible to randomize interference.

The transmitter may be configured to transmit the D2D signal by mapping the reference signal to the physical channel according to the first mapping configuration when a moving speed of the user device is less than or equal to a predetermined threshold, and to transmit the D2D signal by mapping the reference signal to the physical channel according to the second mapping configuration when the moving speed of the user device is greater than the predetermined threshold. By using the moving speed, the user device UE can change the mapping of the reference signal at a more appropriate timing.

The transmitter may be configured to transmit the D2D signal where the reference signal is mapped to the physical channel according to the first mapping configuration or the D2D signal where the reference signal is mapped to the physical channel according to the second mapping configuration, based on an instruction from a base station. This configuration makes it possible to use the new RS configuration in a specific location, e.g., on an expressway, and to use the related-art RS configuration in other locations.

One or more embodiments of the present invention provide a user device for a radio communication system supporting D2D communication. The user device includes a receiver that receives a D2D signal; a detector that determines whether a reference signal is mapped to a physical channel in the D2D signal according to a first mapping configuration or according to a second mapping configuration where the reference signal is mapped to more symbols than in the first mapping configuration, and detects the reference signal based on the result of the determination; and an estimator that performs channel estimation using the reference signal detected by the detector. This user device UE provides a technology that makes it possible to properly change the mapping of a reference signal in a radio communication system supporting D2D.

When determining that the reference signal is mapped to a specific physical channel according to the first mapping configuration, the detector may determine that a reference signal in a physical channel other than the specific physical channel is also mapped according to the first mapping configuration; and when determining that the reference signal is mapped to the specific physical channel according to the second mapping configuration, the detector may determine that the reference signal in the physical channel other than the specific physical channel is also mapped according to the second mapping configuration. This configuration eliminates the need for the user device UE to perform a process for determining whether the reference signal is mapped according to "related-art RS configuration" or "new RS configuration" for each physical channel, and thereby makes it possible to reduce the processing load of the user device UE.

When the second mapping configuration is applied to a PSSCH, the estimator may identify parameters used to generate the reference signal mapped to the PSSCH based on information included in a PSCCH, and perform the channel estimation by using the identified parameters. This configuration makes it possible to change parameters for generating a reference signal at the transmitting user device UEa as necessary, and thereby makes it possible to randomize interference.

One or more embodiments of the present invention provide a signal transmission method performed by a user device for a radio communication system supporting D2D communication. The method includes transmitting a D2D signal by mapping a reference signal to a physical channel according to a first mapping configuration or according to a second mapping configuration where the reference signal is mapped to more symbols than in the first mapping configuration. When transmitting the D2D signal by applying the second mapping configuration to a PSSCH, parameters for generating the reference signal to be mapped to the PSSCH are generated based on information included in a PSCCH. This signal transmission method provides a technology that makes it possible to properly change the mapping of a reference signal in a radio communication system supporting D2D.

One or more embodiments of the present invention provide a signal reception method performed by a user device for a radio communication system supporting D2D communication. The method includes receiving a D2D signal; determining whether a reference signal is mapped to a physical channel in the D2D signal according to a first mapping configuration or according to a second mapping configuration where the reference signal is mapped to more symbols than in the first mapping configuration, and detecting the reference signal based on the result of the determination; and performing channel estimation using the detected reference signal. This signal reception method provides a technology that makes it possible to properly change the mapping of a reference signal in a radio communication system supporting D2D.

<Supplementary Description of Embodiments>

The user device UE may be configured to transmit a D2D signal always using the "new RS configuration". This configuration makes it possible to eliminate the need for the transmitting user device UEa and the receiving user device UEb to perform processes for selecting and identifying an RS configuration.

The names of physical channels used in the above embodiments are just examples, and the present invention may also be applied to other physical channels.

A D2D signal, an RRC signal, and a control signal may be a D2D message, an RRC message, and a control message, respectively.

The order of steps described in each method claim is an example, and the steps may be performed in any other order unless otherwise mentioned.

The embodiments of the present invention may be applied to LTE (Long Term Evolution), LTE-A (LTE-Advanced), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-Wideband), Bluetooth (registered trademark), and/or any other appropriate system.

Components of each apparatus (the user device UE, the base station eNB) described in the above embodiments may be implemented by executing a program stored in a memory by a CPU (processor) of the apparatus, may be implemented by hardware such as hardware circuits including logic for the above-described processes, or may be implemented by a combination of programs and hardware.

A user device, a signal transmission method, and a signal reception method according to embodiments of the present invention are described above. However, the present invention is not limited to the above-described embodiments, and a person skilled in the art may understand that variations, modifications, and replacements may be made to the above embodiments. Although specific values are used in the above descriptions to facilitate the understanding of the present invention, the values are just examples and other appropriate values may also be used unless otherwise mentioned. Grouping of subject matter in the above descriptions is not essential for the present invention. For example, subject matter described in two or more sections may be combined as necessary, and subject matter described in one section may be applied to subject matter described in another section unless they contradict each other. Boundaries of functional units or processing units in functional block diagrams do not necessarily correspond to boundaries of physical components. Operations of multiple functional units may be performed by one physical component, and an operation of one functional unit may be performed by multiple physical components. The order of steps in sequence charts and flowcharts described in the embodiments may be changed unless they do not become inconsistent. Although functional block diagrams are used to describe the user device UE and the base station eNB, the user device UE and the base station eNB may be implemented by hardware, software, or a combination of them. Software to be executed by a processor of the user device UE and software to be executed by a processor of the base station eNB according to the embodiments of the present invention may be stored in any appropriate storage medium such as a random access memory (RAM), a flash memory, a read-only memory (ROM), an EPROM, an EEPROM, a register, a hard disk drive (HDD), a removable disk, a CD-ROM, a database, or a server.

In the above embodiments, the related-art RS configuration is an example of a first mapping configuration. The new RS configuration is an example of a second mapping configuration. The RS configuration selector 103 is an example of a selector. The RS detector 104 is an example of a detector. The channel estimator 105 is an example of an estimator.

What is claimed is:

1. A terminal supporting Device-to-Device (D2D) communication, the terminal comprising:
   a processor that selects a first mapping configuration or a second mapping configuration and that maps a reference signal to a Physical Sidelink Shared Channel (PSSCH) according to the selected mapping configuration;
   wherein the reference signal mapped to the PSSCH is mapped to more symbols in the second mapping configuration than in the first mapping configuration,
   wherein, when the processor selects the first mapping configuration, the processor includes first information indicating the selected first mapping configuration in a Physical Sidelink Control Channel (PSCCH),
   wherein, when the processor selects the second mapping configuration, the processor includes second information indicating the selected second mapping configuration in the PSCCH, and
   wherein, when the reference signal is mapped to a first PSSCH according to the first mapping configuration, the processor maps a reference signal in a second PSSCH according to the first mapping configuration, and when the reference signal is mapped to the first PSSCH according to the second mapping configuration, the processor maps the reference signal in the second PSSCH according to the second mapping configuration.

2. The terminal as claimed in claim 1, wherein the processor maps the reference signal to the PSSCH according to the first mapping configuration when a moving speed of the terminal is less than or equal to a predetermined threshold, and the processor maps the reference signal to the PSSCH according to the second mapping configuration when the moving speed of the terminal is greater than the predetermined threshold.

3. The terminal as claimed in claim 1, wherein the processor selects the first mapping configuration or the second mapping configuration, based on an instruction from a base station.

4. A terminal supporting Device-to-Device (D2D) communication, the terminal comprising:
a detector that determines whether a reference signal is mapped to a Physical Sidelink Shared Channel (PSSCH) according to a first mapping configuration or according to a second mapping configuration, and detects the reference signal based on a result of the determination; and
an estimator that performs channel estimation using the reference signal detected by the detector,
wherein the reference signal mapped to the PSSCH is mapped to more symbols in the second mapping configuration than in the first mapping configuration,
wherein, when a Physical Sidelink Control Channel (PSCCH) includes first information indicating the first mapping configuration, the detector determines that the reference signal is mapped according to the first mapping configuration,
wherein, when the PSCCH includes second information indicating the second mapping configuration, the detector determines that the reference signal is mapped according to the second mapping configuration, and
wherein, when determining that the reference signal is mapped to a first PSSCH according to the first mapping configuration, the detector determines that a reference signal in a second PSSCH is also mapped according to the first mapping configuration, and when determining that the reference signal is mapped to the first PSSCH according to the second mapping configuration, the detector determines that the reference signal in the second PSSCH is also mapped according to the second mapping configuration.

5. A signal transmission method performed by a terminal supporting Device-to-Device (D2D) communication, the method comprising:
selecting a first mapping configuration or a second mapping configuration; and
mapping a reference signal to a Physical Sidelink Shared Channel (PSSCH) according to the selected mapping configuration,
wherein the reference signal mapped to the PSSCH is mapped to more symbols in the second mapping configuration than in the first mapping configuration,
wherein, when the selecting selects the first mapping configuration, the selecting includes first information indicating the selected first mapping configuration in a Physical Sidelink Control Channel (PSCCH),
wherein, when the selecting selects the second mapping configuration, the selecting includes second information indicating the selected second mapping configuration in the PSCCH, and
wherein, when the reference signal is mapped to a first PSSCH according to the first mapping configuration, the terminal maps a reference signal in a second PSSCH according to the first mapping configuration, and when the reference signal is mapped to the first PSSCH according to the second mapping configuration, the terminal maps the reference signal in the second PSSCH according to the second mapping configuration.

6. A signal reception method performed by a terminal supporting Device-to-Device (D2D) communication, the method comprising:
determining whether a reference signal is mapped to a Physical Sidelink Shared Channel (PSSCH) according to a first mapping configuration or according to a second mapping configuration, and detecting the reference signal based on a result of the determination; and
performing channel estimation using the detected reference signal,
wherein the reference signal mapped to the PSSCH is mapped to more symbols in the second mapping configuration than in the first mapping configuration,
wherein, when a Physical Sidelink Control Channel (PSCCH) includes first information indicating the first mapping configuration, the determining determines that the reference signal is mapped according to the first mapping configuration,
wherein, when the PSCCH includes second information indicating the second mapping configuration, the determining determines that the reference signal is mapped according to the second mapping configuration, and
wherein, when determining that the reference signal is mapped to a first PSSCH according to the first mapping configuration, the terminal determines that a reference signal in a second PSSCH is also mapped according to the first mapping configuration, and when determining that the reference signal is mapped to the first PSSCH according to the second mapping configuration, the terminal determines that the reference signal in the second PSSCH is also mapped according to the second mapping configuration.

* * * * *